Feb. 2, 1960     J. J. POGREBNIAK     2,923,532
COUPLING FOR ATTACHING A ROTATABLE SHAFT TO A NOZZLE
Filed Dec. 2, 1955
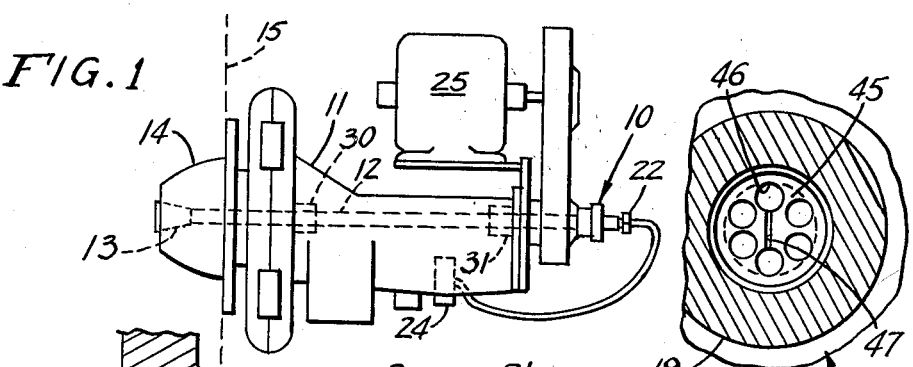
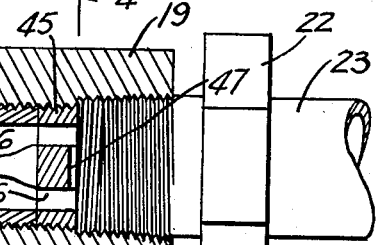
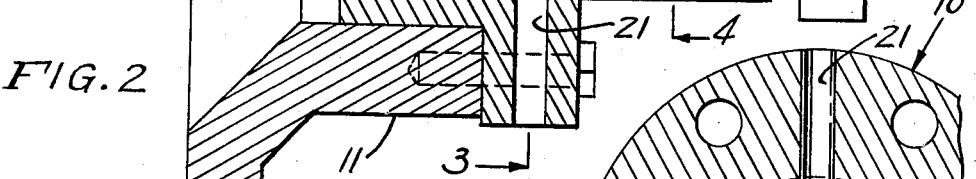
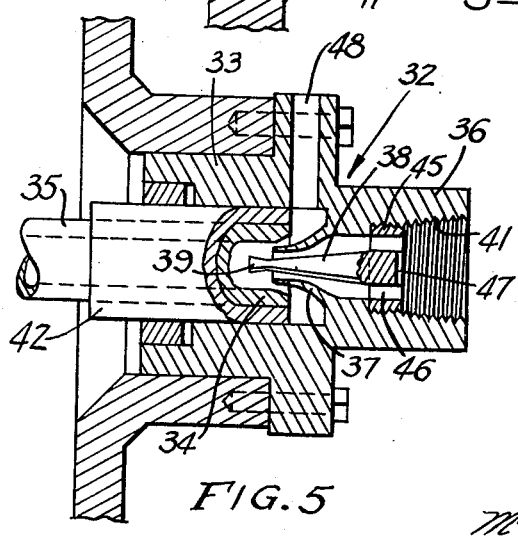
INVENTOR.
JACOB J. POGREBNIAK
BY
McMorrow, Berman & Davidson
ATTORNEYS 2,923,532

COUPLING FOR ATTACHING A ROTATABLE SHAFT TO A NOZZLE

Jacob Joseff Pogrebniak, Fairfax, Calif.

Application December 2, 1955, Serial No. 550,671

3 Claims. (Cl. 261—76)

The present invention relates to a coupling for attaching a rotatable shaft to a nozzle.

An object of the present invention is to provide a coupling for attaching a rotatable shaft to a nozzle which has means for transferring fluid from a nozzle located on the end of a fixed supply line to a rotating shaft without leakage and without producing excessive heat due to friction.

Another object of the present invention is to provide a coupling for attaching a rotatable shaft to a nozzle which has means for creating an area of negative pressure at the inlet end of the rotating shaft and for mixing air with a fluid as it is transferred from a nozzle on the end of a fixed supply line to the rotating shaft.

A further object of the present invention is to provide a coupling for attaching a rotatable shaft to a nozzle which is of simple structure, sturdy in construction with no moving parts and one which is economically feasible.

These and other objects and advantages of the present invention will be fully apparent from the following description when taken in connection with the annexed drawing, in which:

Figure 1 is an elevational view of an oil burner showing the coupling of the present invention installed thereon and connected by a conduit to the burner fuel pump, Figure 2 is a sectional view, on an enlarged scale, of a portion of the assembly of Figure 1, Figure 3 is a sectional view, taken on the line 3—3 of Figure 2, Figure 4 is a sectional view, taken on the line 4—4 of Figure 2, and Figure 5 is a sectional view, on a reduced scale, of another form of the coupling of the present invention.

Referring in greater detail to the drawing in which like numerals indicate like parts throughout the several views, the coupling of the present invention is designated generally by the reference numeral 10 and is for use with an oil burner shown in Figure 1 and designated by the reference numeral 11. The oil burner 11 has a hollow rotatable shaft 12, shown in dotted lines in Figure 1, and an outwardly-flaring atomizer cup 13 is carried on one end of the shaft within a nozzle structure including a nozzle protector 14. When in use, the cup 13 and protector 14 are within the furnace or boiler indicated by a dotted line in Figure 1 as at 15.

A nozzle 16 is arranged in spaced end to end relation with respect to the hollow rotatable shaft 12, the coupling 10 having the portion 17 adjacent one end embracingly receiving the portion 18 of the shaft 12 adjacent one end thereof and having the portion 19 adjacent the other end embracingly receiving the nozzle 16.

A passage 21 extends transversely of the coupling 10 from one side to the other side intermediate the end portions 17 and 19 and is in communication with the space between the nozzle 16 and the adjacent wall of the shaft portion 18 for introducing air into the hollow rotatable shaft 12 forwardly of the nozzle 16. Means is provided connecting the nozzle 16 to a source of fuel oil under pressure. Specifically this means includes a male coupling element 22 threadedly received within the portion 19 of the coupling 10 and connected to one end of a conduit 23, the other end of the conduit 23 being connected to the fuel pump 24 mounted upon the oil burner 11 and driven by the motor of the oil burner, the motor being indicated by the numeral 25.

A post 26 is arranged coaxially of and spaced from the nozzle 16 and is supported by one end in a spider 45 positioned within the coupling 10. The post 26 has an outwardly flaring portion 27 adjacent its other end projecting from the nozzle 16.

A sleeve bearing 28 covers the portion 18 of the shaft 12 and rests in the portion 17 of the coupling 10. An oil seal 29, manually pressed into place, is interposed between the portion 17 of the coupling 10 and the sleeve bearing 28. The shaft 12 is supported in bearings 30 and 31, as seen in Figure 1.

In the form of the invention shown in Figure 5, the coupling 32 includes a portion 33 adjacent one end embracingly receiving a portion 34 of a shaft 35 and a portion 36 adjacent the other end having a nozzle 37 formed integrally therein. A post 38 is arranged coaxially within the nozzle 37 and has a portion adjacent one end flaring outwardly as indicated by the reference numeral 39. The coupling 32 is provided with internal threads 41 within its portion 36 for attachment of a male coupling element such as that shown in Figure 2 and indicated by the reference numeral 23 for connecting the coupling 32 to a source of fluid or fuel oil under pressure. A sleeve 42 carried within the portion 33 of the coupling 32 covers the portion 34 of the shaft 35.

In each of the embodiments of the coupling of the present invention shown herein described, the posts 26 and 38 are supported upon a spider 45, as seen in Figure 4, the spider having a plurality of passages 46 for the passage of oil and a transversely-arranged slot 47 for the reception of the end of a screwdriver for positioning the spider within the respective one of the couplings.

In the embodiment shown in Figure 5, the coupling 32 has a passage 48 extending transversely inwardly from one side of the coupling 32 intermediate the portions 33 and 36, the passage being in communication with the space between the nozzle 37 and the portion 34 of the shaft 35. Air is introduced through the passage 48 into the space between the nozzle 37 and the portion 34 of the shaft 35 and is mixed with fuel oil flowing through the space between the nozzle 37 and the post 38. In the embodiment shown in Figure 2, the same action takes place, the air being admitted through the passage 21 and is mixed with oil flowing between the nozzle 16 and shaft end 18. The outwardly-flaring portions of each of the posts 26 and 38 serves further to spread the flow of oil outwardly to be mixed thoroughly with the air flowing between the shaft end portion and the respective nozzle. This causes a negative pressure to be created in the coupling which is essential to prevent leaking of oil and allows the use of a liberal clearance around the shaft at the same time.

What is claimed is:

1. The combination with a hollow rotatable shaft and a nozzle arranged in spaced end to end relation with respect to said shaft, of a coupling having the portion adjacent one end embracingly receiving a portion of said shaft adjacent one end thereof and having the portion adjacent the other end embracingly receiving said nozzle, said nozzle being arranged so that it extends into and is spaced from said one end shaft portion, there being a passage extending transversely inwardly from one side of said coupling intermediate said end portions and in communication with the space between said nozzle and said one end shaft portion for introducing air into said hollow shaft forwardly of said nozzle, and means connecting said nozzle to a source of fuel oil under pressure.

2. The combination with a hollow rotatable shaft and a nozzle arranged in spaced end to end relation with respect to said shaft, of a coupling having the portion adjacent one end embracingly receiving a portion of said shaft adjacent one end thereof and having the portion adjacent the other end embracingly receiving said nozzle, said nozzle being arranged so that it extends into and is spaced from said one end shaft portion, there being a passage extending transversely from one side to the other side of said coupling intermediate said end portions and in communication with the space between said nozzle and said one end shaft portion for introducing air into said hollow shaft forwardly of said nozzle, and means connecting said nozzle to a source of fuel oil under pressure.

3. The combination with a hollow rotatable shaft and a nozzle arranged in spaced end to end relation with respect to said shaft, of a coupling having the portion adjacent one end embracingly receiving a portion of said shaft adjacent one end thereof and having the portion adjacent the other end embracingly receiving said nozzle, said nozzle being arranged so that it extends into and is spaced from said one end shaft portion, there being a passage extending transversely inwardly from one side of said coupling intermediate said end portions and in communication with the space between said nozzle and said one end shaft portion for introducing air into said hollow shaft forwardly of said nozzle, means connecting said nozzle to a source of fuel oil under pressure, and a post arranged coaxially of and spaced from said nozzle and supported by one end in a spider positioned within said coupling and having a portion adjacent its other end which flares outwardly and projects from said nozzle.

References Cited in the file of this patent

UNITED STATES PATENTS

| | | |
|---|---|---|
| 356,247 | Harwood | Jan. 18, 1887 |
| 772,530 | McGee | Oct. 18, 1904 |
| 1,092,079 | Reeder | Mar. 31, 1914 |
| 1,199,747 | Benham | Sept. 26, 1916 |